United States Patent [19]

Sondermann

[11] 4,269,706

[45] May 26, 1981

[54] METHOD OF DECONTAMINATING RADIOACTIVE PROCESS WASTE WATERS

[75] Inventor: Thomas Sondermann, Kahl/Main, Fed. Rep. of Germany

[73] Assignee: Reaktor-Brennelment Union GmbH, Hanau, Fed. Rep. of Germany

[21] Appl. No.: 73,521

[22] Filed: Sep. 7, 1979

Related U.S. Application Data

[63] Continuation-in-part of Ser. No. 908,952, May 24, 1978, abandoned.

[30] Foreign Application Priority Data

Jun. 2, 1977 [DE] Fed. Rep. of Germany ....... 2724954

[51] Int. Cl.[3] ........................... C02F 1/52; G21F 9/10

[52] U.S. Cl. .................................... 210/682; 210/724; 210/738; 252/301.1 W; 423/11; 423/12; 423/251; 423/252; 423/253

[58] Field of Search ...................... 210/28, 38 C, 42 R, 210/49, 50-53, 59, 61; 252/301.1 R, 301.1 W X; 423/11, 12, 15, 251-254

[56] References Cited

U.S. PATENT DOCUMENTS

| | | | |
|---|---|---|---|
| 2,766,204 | 10/1956 | Lowe | 210/23 |
| 2,838,370 | 6/1958 | Calkins | 423/253 |
| 3,764,553 | 10/1973 | Kirby | 252/301.1 R |
| 3,890,244 | 6/1975 | Carlin | 252/301.1 W |

OTHER PUBLICATIONS

Glueckauf, *Atomic Energy Waste,* 1961, pp. 206, 207, 346, 347.

*Primary Examiner*—Peter A. Hruskoci

*Attorney, Agent, or Firm*—Herbert L. Lerner

[57] ABSTRACT

Process waste waters at a pH of about 7 contaminated with radioactive isotopes are decontaminated by (a) adjusting the pH to about 5.8, (b) adding CaO or $Ca(OH)_2$ to raise the pH to about 8.5, (c) agitating the mixture for at least 5 minutes to effect intimate contact and produce a suspension of solids containing radioactive contaminants, and (d) separating the suspension of solids from the water by centrifuging. Removal of radioactive uranium isotopes with an alpha emission is effected at a pH of about 10. The process provides a method for concentrating radioactive contaminants in water for subsequent ultimate storage and also purifies the contaminated water so it may be safe to discharge it into the sewer. The treatment may be carried out in a plurality of stages in series.

5 Claims, 1 Drawing Figure

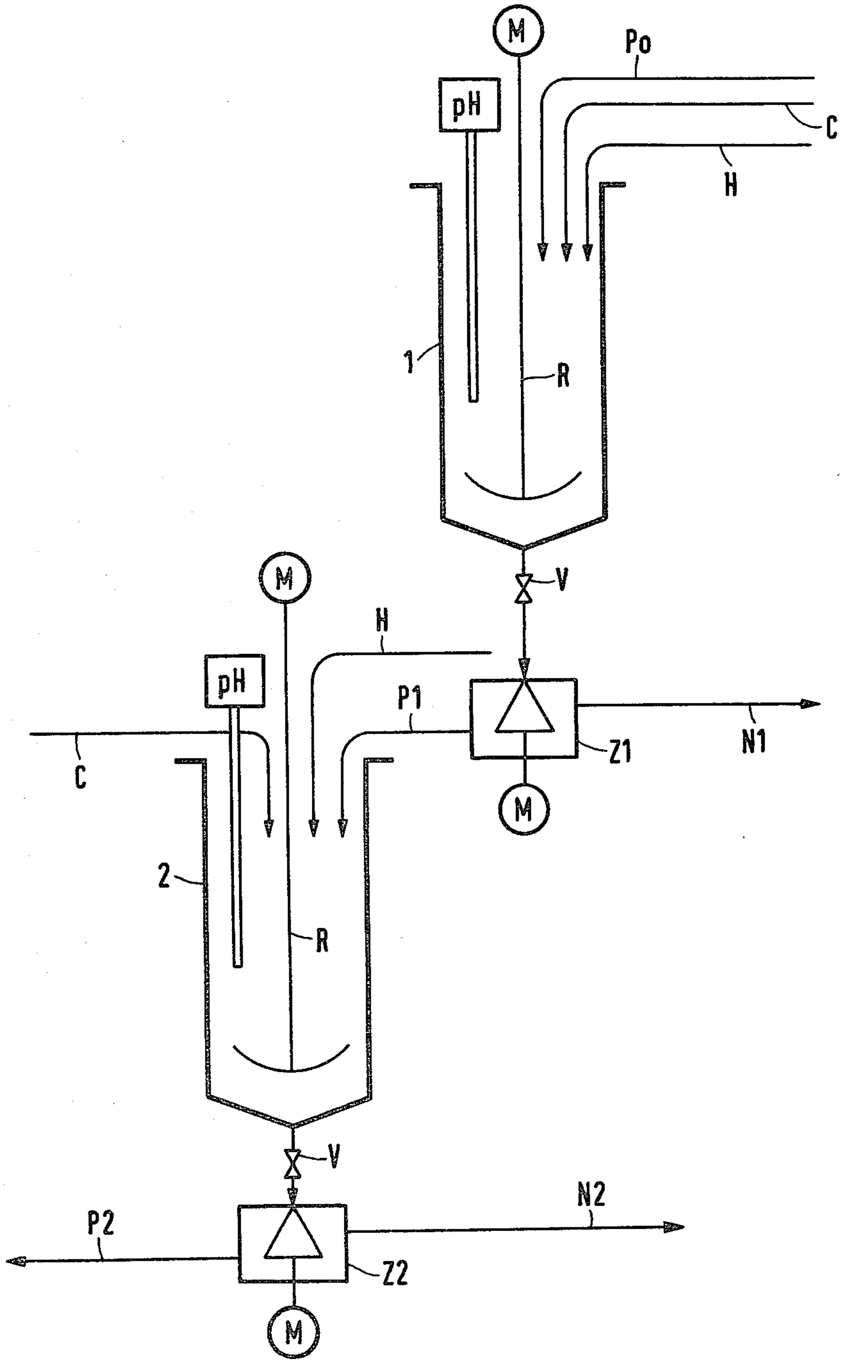
M
Po
pH
C
H
1
R
V
M
H
pH
P1
N1
C
Z1
M
2
R
V
N2
P2
Z2
M

METHOD OF DECONTAMINATING RADIOACTIVE PROCESS WASTE WATERS

CROSS REFERENCE TO RELATED APPLICATION

The present application is a continuation-in-part of my co-pending application Ser. No. 908,952, filed May 24, 1978, now abandoned.

BACKGROUND OF THE INVENTION

1. Field of the Invention

The present invention relates to treating waste water and more particularly refers to a new and improved process for decontaminating process waste waters contaminated with radioactive isotopes.

2. Description of the Prior Art

In the manufacture of uranium dioxide powder from uranium hexafluoride and uranyl nitrate, such as described in detail in German Pat. Nos. 1 126 363, 1 592 477 and 1 924 594, as well as in German Published Non-Prosecuted Application No. 2 127 107, process waste waters of different kinds are obtained, which waste waters are contaminated to a greater or lesser degree. Essentially, process waste waters are an ammonium nitrate solution ($NH_4$ $NO_3$) which may also contain carbonates. The starting pH value of the solution is about 7. Such waste waters contain small amounts of uranium, thorium as well as plutonium which may also be considered a uranium daughter substance. The content of uranium, thorium or plutonium is so low that reclaiming of the same is not worthwhile, and decontamination is resorted to. The contamination consists mainly of different uranium isotopes as well as their daughter substances; the latter, in turn, consists predominantly of thorium isotopes. The radiation of the contamination is mainly in the $\alpha$ and $\beta$ range.

The problem in the treatment of such radioactive process waste waters is not only to concentrate the contamination contained in these waters and to thereby prepare them for ultimate storage, but also to purify the water in the process to such an extent that it can be discharged without hesitation into the sewer system. The radioactivity value of the treated waters should be below the values prescribed by the radiation protection regulation.

SUMMARY OF THE INVENTION

An object of the present invention is to provide a method for treating process waste water contaminated with radioactive isotopes to concentrate the contaminants preparatory to ultimate storage, and purify the waters to allowable low contamination values permissible for discharge into the sewer system.

With the foregoing and other objects in view, there is provided in accordance with the invention a method for decontaminating process waste water, especially from the manufacture of nuclear fuel, containing radioactive isotopes as contaminants, including (a) adjusting the pH of the contaminated process water to a value of about 5.8, (b) adding a reagent selected from the group consisting of CaO and Ca $(OH)_2$ to the contaminated process water of about 5.8 pH in an amount sufficient to raise the pH of the water in the range of up to about 8.5 to about 10, (c) agitating the mixture of the process water and the reagent for at least 5 minutes to effect intimate contact therebetween and produce a suspension in the water of solids containing radioactive contaminants, and (d) centrifuging the water containing the suspended solids to separate the solids containing radioactive contaminants from the water from which radioactive contaminants have been removed in the solids.

Other features which are considered as characteristic for the invention are set forth in the appended claims.

Although the invention is illustrated and described herein as embodied in method of decontaminating radioactive process waste waters, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a method for carrying out the present invention.

DETAILED DESCRIPTION OF THE INVENTION

The process waste water is adjusted to a pH-value of about 5.8. CaO or Ca $(OH)_2$ is subsequently added while constantly stirring until a predetermined pH-value is reached. The suspension produced is separated, after stirring not less than 5 minutes, by means of a centrifuge into its liquid and solid components, which latter contain the contaminants. In order to reach the desired, extremely low final activity of the process waste waters, it is further proposed to operate several such process stages in cascade or series, where at the beginning of the next stage the pH-value is again adjusted to about 5.8 by adding nitric acid.

To explain this invention in further detail, reference is made to the process cycle shown in the attached drawing.

Each stage has a precipitation vessel 1 and 2, respectively, which is equipped with a stirrer R driven by motor M and a conventional pH measuring device. The bottoms of these vessels can be closed off by drain valves V. The liquid, containing suspended solids, flows through a valve into a centrifuge Z1, Z2 for separation of the solids from the liquid. The precipitation vessel 1 is first filled with process water $P_0$ and then nitric acid is added via the line H until the pH-value of about 5.8 is reached. With the stirrer R running, CaO or $Ca(OH)_2$ is thereupon added through the line C until the pH-value has risen to about 8.5. The suspension of solids produced thereby is then stirred for at least another 5 minutes. The liquid containing suspended solids is discharged from the bottom of precipitation vessel 1, through valve V to the centrifuge Z1 driven by motor M. Centrifuge Z1 separates the solid components from the liquid. The former contain the contaminants and are fed as a radioactive precipitate N1 to further waste processing or utilization. The remaining process water P1, which still may be weakly radioactive, is now fed to the second process stage, i.e., the precipitation vessel 2. Nitric acid is again added via the line H to adjust the pH-value to 5.8 and then CaO or $Ca(OH)_2$ is added, constantly moving the stirrer R, until the pH-value 8.5 is reached. At the end of a precipitation period of at least 5 minutes, the valve V is opened as in the first process stage and the solids are separated from the liquid by means of the centrifuge Z2. The solids are again removed from the centrifuge as an active precipitate N2 and fed, like the precipitate N1, to further waste processing or utilization. The process water $P_2$ is now practically free of activity or its activity has dropped below the limit required for safe introduction into the sewer system.

By means of the mentioned adjustment of the pH-value to 8.5 in both stages it is possible to take out particularly Th 234($\beta$) as well as the Th-234 daughter products ($\alpha$). Should uranium ($\alpha$) be contained in the process waters, CaO or $Ca(OH)_2$ are added until the pH-value has reached about 10. With this procedure, uranium ($\alpha$) and thorium ($\beta$) are then precipitated from the process waters.

The numerical values given below illustrate the decontamination effects obtainable with the method in accordance with the invention:

(A) The process waste water had a uranium $\alpha$-activity of 5500 pCi/ml. After the first precipitation at a pH of 10, the activity of the process water was reduced to 12 pCi/ml, and after the second precipitation, the activity of the process water P2 was 7 pCi/ml.

(B) The process water had a thorium $\beta$-activity of 8,500,000 pCi/ml. After the first precipitation at a pH of 8.5, the $\beta$-activity of the process water was 10,000 pCi/ml, and after the second precipitation, the $\beta$-activity in the process water was 150 pCi/ml, and after the third precipitation, the reactivity was only 50 pCi/ml.

For comparison, it should be mentioned that natural superphosphate fertilizer has a $\beta$-activity of about 100 pCi/g.

The size of the precipitation vessels depends on the quantity of process water produced, and their volume can reasonably be in the order of 1 cubic meter. The amount of the CaO or $Ca(OH)_2$ required is usually in the order of 1 to 10 g per liter of process water.

From the description of this method, it is evident that it is especially suitable for low-activity process waters. Through the proper choice of the number of process stages, the desired degree of decontamination may be readily achieved. The applicability of this method is not limited, of course, to process waters, i.e., such as occur, for instance, in the manufacture of nuclear fuel; but also, for example, for decontaminating the contents of fuel pits in this manner.

There is claimed:

1. A method for decontaminating process waste water having a pH of about 7, which is an ammonium nitrate solution, from the manufacture of nuclear fuel, containing radioactive isotopes selected from the group consisting of uranium isotopes, thorium isotopes and plutonium isotopes as contaminants, which comprises (a) adding $HNO_3$ to the contaminated process water to reduce its pH to a value of about 5.8, (b) adding a reagent selected from the group consisting of CaO and Ca $(OH)_2$ to the contaminated process water of about 5.8 pH in an amount sufficient to raise the pH of the water in the range of about 8.5 to about 10, (c) agitating the mixture of the process water and the reagent for at least 5 minutes to effect intimate contact therebetween and produce a suspension in the water of solids containing radioactive contaminants, and (d) centrifuging the water containing the suspended solids to separate the solids containing radioactive contaminants from the water from which radioactive contaminants have been removed in the solids.

2. Method according to claim 1, wherein radioactive isotopes in the process waste water have radioactive thorium isotopes, and wherein the reagent is added to raise the pH of the process water to about 8.5.

3. Method according to claim 1, wherein radioactive isotopes in the process waste water have radioactive uranium isotopes with an alpha emission, and wherein the reagent is added to raise the pH of the process water to about 10.

4. Method according to claim 1 or 2 or 3, wherein decontamination of the process waste water is carried out in a plurality of stages in series with the treatment of the contaminated water up to and including the centrifuging constituting the first stage, and the water from the centrifuge treated in each successive stage in the same manner as in the first stage.

5. Method according to claim 1, wherein decontamination of the process waste water is carried out in a plurality of stages in series with the treatment of the contaminated water up to and including the centrifuging constituting the first stage, and the water from the centrifuge treated in each successive stage in the same manner as in the first stage and wherein the pH of the water is adjusted to about 5.8 at the beginning of each successive stage by adding nitric acid.

* * * * *